United States Patent
Rosenberg (10) Patent No.: US 7,666,373 B2
(45) Date of Patent: Feb. 23, 2010

(54) ALUMINA RECOVERY USING ALUMINUM CONTAINING LAYERED DOUBLE HYDROXIDE

(75) Inventor: Steven Philip Rosenberg, Australind (AU)

(73) Assignee: BHP Billiton Aluminium Australia Pty Ltd., WA (AU)

( * ) Notice: Subject to any disclaimer, the term of this patent is extended or adjusted under 35 U.S.C. 154(b) by 0 days.

(21) Appl. No.: 11/835,750

(22) Filed: Aug. 8, 2007

(65) Prior Publication Data

US 2008/0025891 A1    Jan. 31, 2008

Related U.S. Application Data

(63) Continuation of application No. PCT/AU2006/000172, filed on Feb. 10, 2006.

(30) Foreign Application Priority Data

Feb. 11, 2005   (AU) ............... 2005900629

(51) Int. Cl.
*C01F 7/00* (2006.01)
(52) U.S. Cl. ............ 423/115; 423/116; 423/117; 423/119; 423/120; 423/121
(58) Field of Classification Search ......... 423/115–117, 423/119–121
See application file for complete search history.

(56) References Cited

U.S. PATENT DOCUMENTS 5,068,095 A    11/1991   Nigro et al.
6,743,403 B1 *   6/2004   Rosenberg et al. ......... 423/122

FOREIGN PATENT DOCUMENTS

| AU | 49848/90 | * | 8/1991 |
| AU | 4984890 | | 8/1991 |
| CN | 1405092 | | 3/2003 |
| EP | 0092028 A2 | | 10/1983 |
| EP | 0445543 A1 | | 9/1991 |
| JP | 2002241128 | | 8/2002 |
| RU | 2229440 C1 | | 5/2004 |
| WO | 9929627 A1 | | 6/1999 |
| WO | 00/18684 A | | 4/2000 |
| WO | 02083564 A1 | | 10/2002 |

OTHER PUBLICATIONS

Translation of Japan 2002241128, Aug. 2002.*
Translation of EP 0092028, Oct. 1983.*
Translation of CN 1405092, Mar. 2003.*
Translation of EP 0445543, Sep. 1991.*
European Search Report dated Aug. 19, 2009.

* cited by examiner

*Primary Examiner*—Steven Bos
(74) *Attorney, Agent, or Firm*—Edell, Shapiro & Finnan, LLC (57) ABSTRACT

A process for recovering alumina values from a first liquor having an initial concentration of aluminate ions and hydroxyl ions in solution is described. The first liquor is treated with a hydroxide of a metal other than aluminium to form an aluminium-bearing layered double hydroxide and produce a treated stream of first liquor, the treated stream of first liquor having a final concentration of aluminate ions less than the initial concentration of aluminate ions. The aluminium-bearing layered double hydroxide is separated from the treated stream of first liquor. Thereafter the clarified treated stream of first liquor is returned to a first location within an alumina refinery. The separated aluminium-bearing layered double hydroxide is contacted with a solution containing carbonate ions to form a slurry comprising an insoluble salt of the metal other than aluminium and a second liquor comprising aluminate ions released from the aluminium-bearing layered double hydroxide.

34 Claims, 3 Drawing Sheets

ALUMINA RECOVERY USING ALUMINUM CONTAINING LAYERED DOUBLE HYDROXIDE

CROSS REFERENCE TO RELATED APPLICATIONS

This application is a continuation of PCT application No. PCT/AU2006/000172, filed on 10 Feb. 2006 and entitled "Alumina Recovery", the disclosure of which is hereby incorporated by reference in its entirety.

FIELD OF THE INVENTION

The present invention relates to a process for recovering alumina values from a first liquor stream containing aluminate ions and hydroxyl ions in solution by forming an aluminium-bearing layered double hydroxide.

The present invention further relates to the use of aluminium-bearing layered double hydroxides (LDHs) to improve recovery of alumina values from bauxite using a modified form of the Bayer process.

BACKGROUND OF THE INVENTION

The Bayer process has been used to recover alumina values from bauxitic ores for over a century. The process centres on the following reversible equations, for gibbsitic and boehmitic or diasporic ores, respectively (1):

$$Al(OH)_3 + OH^- \leftrightarrow Al(OH)_4^-  \quad (1)$$

$$AlO(OH) + OH^- + H_2O \leftrightarrow Al(OH)_4^- \quad (2)$$

Figure 1:
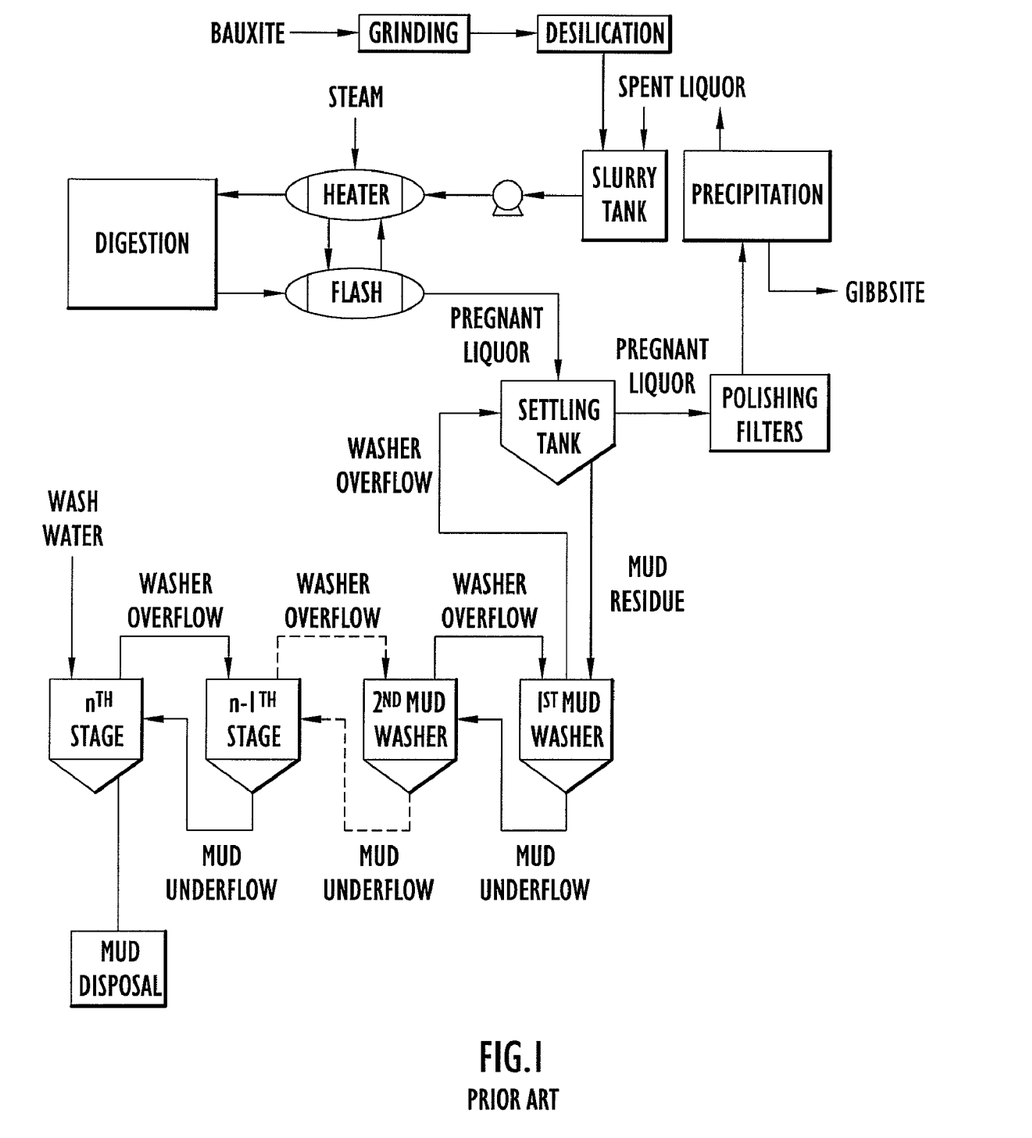
FIG. 1 is a simplified conceptual flow diagram of a basic implementation of a traditional prior art Bayer Process.

A schematic flowsheet showing a basic implementation of a traditional Bayer Process is illustrated in FIG. 1. Blended bauxite ore is first mixed with a portion of the recycled spent liquor and subjected to grinding to reduce particle size. The resultant slurry is then treated via a process known as "desilication" or "slurry holding" to remove soluble silica minerals present in the bauxite, typically in the form of insoluble sodium aluminosilicates.

The desilicated slurry is then mixed with the remainder of the spent liquor and the alumina values of the bauxite extracted via a process referred to as "digestion". In digestion, the conditions are manipulated so as to drive equation (1) or (2) towards the right hand side. During digestion, the free caustic dissolves the aluminous mineral from the bauxite to form a concentrated sodium aluminate solution leaving behind a mud residue of undissolved minerals and impurities, principally inert iron oxides and hydroxides, titanium oxides and silicious compounds. The mud residue is often red in appearance due to the presence of the iron minerals and is thus commonly referred to as "red mud". Digestion is favoured by using conditions of high temperature and pressure and these are in turn dependent on the type of ore being treated. Gibbsitic bauxite can be digested at temperatures ranging from about 100-180° C., although 145° C. is most common. Boehmitic or diasporic bauxites are less soluble and require temperatures in the vicinity of 250-270° C. to effect digestion. The equilibrium expressed in equations (1) and (2) can also be displaced to the right hand side by increasing the concentration of free caustic (hydroxyl ions).

In a typical alumina refinery, steam is used to heat the desilicated slurry to the temperature required for digestion. This steam is partially recovered from a series of flash coolers used to reduce the temperature and/or pressure of the mud-laden pregnant liquor that leaves the digesters. The final stage of heating uses high pressure steam from a boiler, usually a powerhouse boiler. Typically the flash coolers are used to reduce the temperature of the mud laden pregnant liquor to the atmospheric boiling point by flowing through a series of flash vessels which operate at successively lower pressures.

After flash cooling, the pregnant liquor is separated from the mud residue in a process referred to as "clarification". The slurry is fed to one or more settling tanks in which the solid particles sink to the bottom and are removed, typically by pumping to the mud washing circuit. Flocculants may be added to the settling tanks to improve the rate of mud settling and achieve good clarity in the settler overflow liquor.

The mud washing circuit relies on a counter-current decantation process to recover as much sodium aluminate as possible for re-use to minimise loss of alumina and caustic values and to cleanse the mud residue so that it can be disposed of in an environmentally acceptable manner. The washer overflow that subsequently exits the first stage mud washing tank is either directed to the settling tanks, or mixed with the settler overflow liquor to form clarified pregnant liquor. The washed mud residue from the final stage in the mud washing circuit is typically pumped to a mud disposal lake. The counter-current mud washing circuit is fed with wash water, typically fresh water, condensate (condensed steam) or recycled water from the mud disposal lake (known as "lake water"), or combinations of the above.

The clarified pregnant liquor which overflows the settling tanks is subjected to filtration before being sent to the precipitation stage in which the equilibrium of equation (1) (reproduced again below) is driven towards the left hand side to form pure $Al(OH)_3$, also referred to as "gibbsite".

$$Al(OH)_3 + OH^- \leftrightarrow Al(OH)_4^- \quad (1)$$

Precipitation is initiated by seeding, and is favoured by conditions that increase the supersaturation of the liquor, such as reducing the temperature, increasing the concentration of aluminate ions, or diluting the solution. The precipitated gibbsite is separated via hydrocyclones, thickeners or filters. The remaining liquor, after evaporation to remove excess water that has entered the process with the bauxite and various washing steps is referred to as "spent liquor" and will have aluminate ions and hydroxyl ions present in an amount that depends on the temperature, seed surface area and residence time of the precipitation stage. To recover the alumina values and caustic, the spent liquor is recycled to digestion. Thus the spent liquor that is recycled to digestion has dissolved alumina present in it.

The primary goal of the Bayer process is to extract the maximum amount of alumina values (Al) from the bauxite fed to digestion into solution and then completely recover this dissolved alumina from the solution in the form of gibbsite during precipitation. The upper limit of the refinery's precipitation yield is set by the difference between the solubility of alumina in a particular liquor at the digestion temperature and the solubility of alumina in that liquor at the temperature used for precipitation. It follows then, that maximizing this difference is a primary aim of most alumina refineries.

Increasing the solubility of an aluminous mineral by raising the temperature or caustic concentration carries a number of unwanted consequences, including increasing the dissolution of siliceous materials. In the prior art, one method for increasing the alumina content of Bayer liquors derived from the less soluble boehmitic and diasporic ores involves "sweetening" the liquor (after digestion of the primary ore) with a small amount of a secondary gibbsitic ore, in a second digestion step.

To date, there is no known method of increasing the alumina concentration of the liquor after digestion.

One of the main avenues for alumina loss in an alumina refinery is in the liquor that is pumped with the mud residue from the settling tanks into the mud washing circuit. This liquor is supersaturated pregnant liquor having effectively the same concentration of aluminate ions as the pregnant liquor sent to precipitation. The liquor that overflows each stage in the counter-current mud washing circuit becomes progressively cooler and more diluted with wash water. This effectively increases the supersaturation of the liquor, encouraging precipitation of gibbsite in accordance with equation (1). The mud particles in the residue have a high surface area that further encourages such precipitation of gibbsite in the mud washing circuit. Any alumina that precipitates in the mud washing circuit in this manner is lost, as is any dissolved alumina in the liquor reporting to the mud disposal lake.

There is a need for an alternative method of maximizing the recovery of alumina values in an alumina refinery.

SUMMARY OF THE INVENTION

According to a first aspect of the present invention there is provided a process for recovering alumina values from a first liquor having an initial concentration of aluminate ions and hydroxyl ions in solution, the process comprising the steps of:
  a) treating the first liquor with a hydroxide of a metal other than aluminium (i.e., aluminum) to form an aluminium-bearing (aluminum-bearing) layered double hydroxide and produce a treated stream of first liquor, the treated stream of first liquor having a final concentration of aluminate ions less than the initial concentration of aluminate ions;
  b) separating the aluminium-bearing layered double hydroxide of step a) from the treated stream of first liquor to recover aluminium from the layered double hydroxide; and
  c) thereafter returning the treated stream of first liquor to a first location within an alumina refinery.

The first liquor stream may be spent liquor or an overflow stream from a mud washing stage. In one embodiment the first location within the alumina refinery is after precipitation and prior to digestion. In an alternative or complimentary embodiment, the first location in an alumina refinery is a mud washing stage.

The separated aluminium-bearing LDH may be stored or sold or advantageously subjected to further processing in the alumina refinery to make use of the alumina values stored therein. Accordingly, in one embodiment of the present invention, the process further comprises the step of contacting the separated aluminium-bearing layered double hydroxide of step b) with a solution containing carbonate ions to form a slurry comprising an insoluble salt of the metal other than aluminium and a second liquor comprising aluminate ions released from the aluminium-bearing layered double hydroxide. Preferably the insoluble salt of the metal other than aluminium is separated from the second slurry to form a clarified second liquor stream. The separated insoluble salt of the metal other than aluminium may be further treated to re-form the metal hydroxide used in step a) and recycled to the refinery or otherwise disposed of.

Advantageously, the process further comprises the step of returning the clarified second liquor stream having an increased aluminate ion concentration to a second location in the alumina refinery. One such suitable second location in the alumina refinery is clarification after digestion and prior to precipitation. The second liquor stream can be directed into the settling tanks or sent directly to the polishing filters prior to precipitation.

One suitable source of carbonate ions in solution is lake water. Preferably, the carbonate ion solution contains one or both of sodium carbonate or sodium bicarbonate. The sodium carbonate may be added as a solid species and mixed with a third liquor stream to decompose the aluminium-bearing LDH. If required, the process may further comprising the step of boosting the carbonate concentration of the solution containing carbonate ions by adding a stream or solid species rich in sodium carbonate or by adding carbon dioxide, preferably conducted using a sparge or a gas absorption system.

Advantageously, the carbonate ion solution may be a spent liquor or an overflow stream from a mud washing stage.

In one embodiment, the metal other than aluminium used to form the aluminium-bearing layered double hydroxide in step (a) is calcium such that the aluminium-bearing LDH is hydrocalumite. Using this embodiment, calcium hydroxide is used for step a) and can be formed by slaking of quicklime in a slaking solution, the addition of hydrated lime or quicklime directly into the first liquor to form the calcium hydroxide in situ. The risk of an undesirable side reaction of the hydrocalumite to form tricalcium aluminate during step (a) can be mitigated by the addition of an inhibitor in the form of a surfactant prior to or during step (a).

In an alternative embodiment, the metal other than aluminium used to form the aluminium-bearing layered double hydroxide in step (a) is magnesium and the aluminium-bearing layered double hydroxide formed is hydrotalcite.

Advantageously, the aluminium-bearing layered double hydroxide produced using the process according to the first aspect of the present invention may be used as a vehicle to transport alumina values from a first location in an alumina refinery to a second location in the alumina refinery. In one embodiment, the first location within the alumina refinery is after precipitation and prior to digestion. In an alternative or complimentary embodiment, the first location in an alumina refinery is a mud washing stage. Preferably, the second location in the alumina refinery is clarification after digestion and prior to precipitation.

Advantageously, the aluminium-bearing layered double hydroxide produced using the process according to the first aspect of the present invention may be used as a means for concentrating a first liquor stream. The first liquor stream may be a spent liquor or an overflow stream from a mud washing stage.

Figure 2:
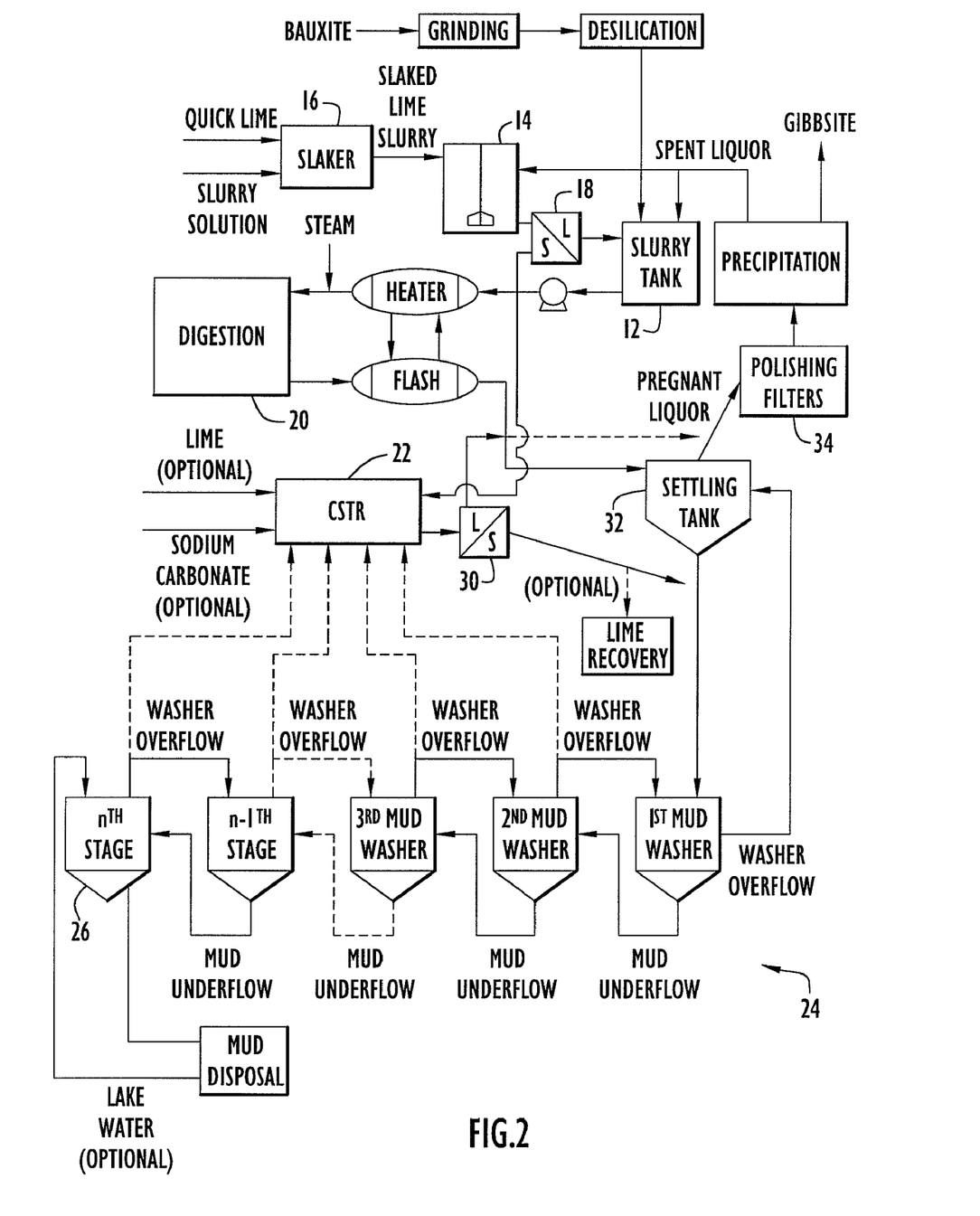
FIG. 2 is a simplified conceptual flow diagram illustrating a first embodiment of the present invention in accordance with Example 1.
Figure 3:
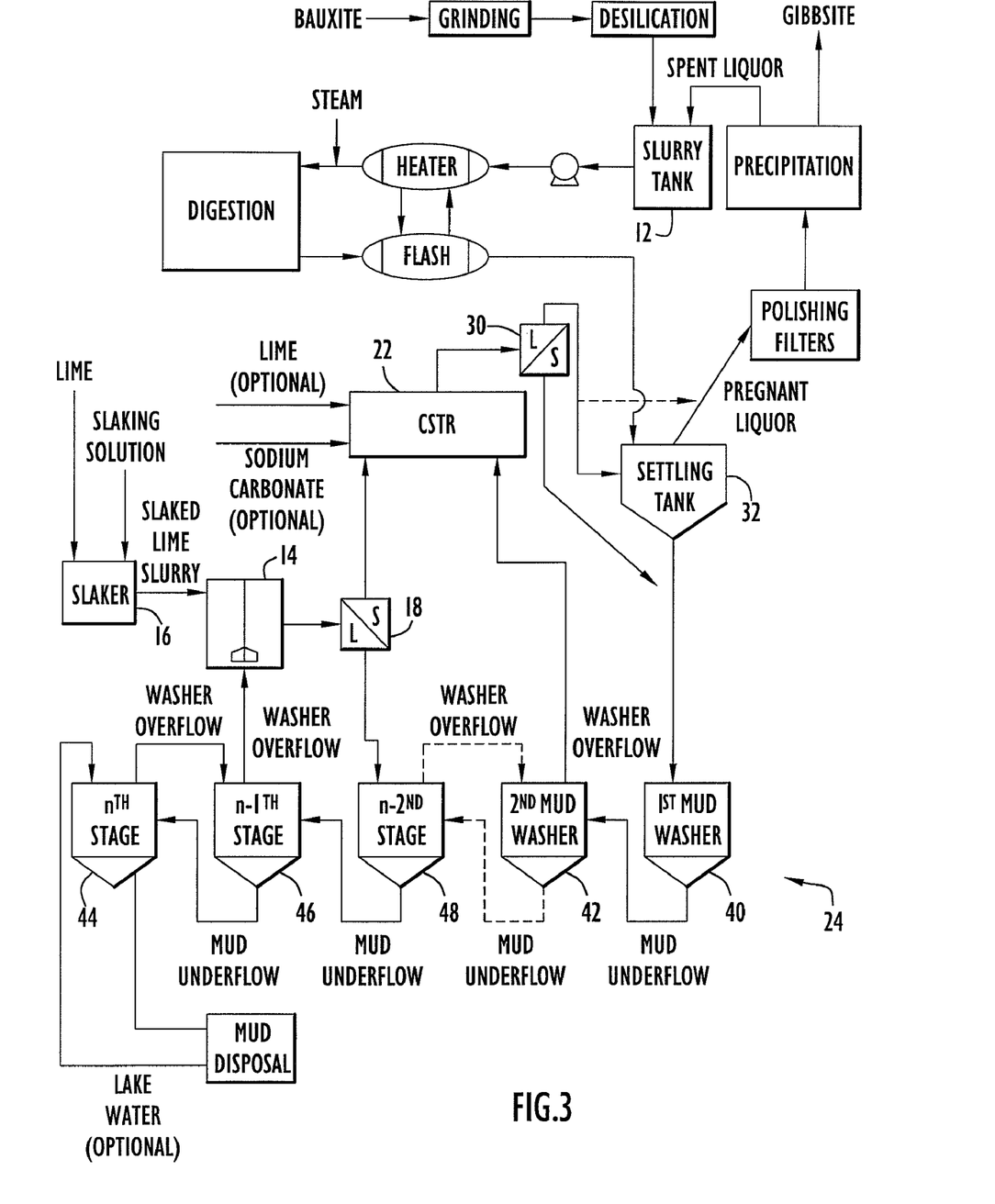
FIG. 3 is a conceptual flow diagram illustrating a second embodiment of the present invention in accordance with Example 2.

According to a second aspect of the present invention there is provided a process substantially as herein described with reference to and as illustrated in FIG. 2 or 3.

BRIEF DESCRIPTION OF THE DRAWINGS

In order to facilitate a more detailed understanding of the nature of the invention several embodiments of the improved causticisation process and apparatus will now be described in detail, by way of example only, with reference to the accompanying drawings, in which.

DETAILED DESCRIPTION OF PREFERRED EMBODIMENTS

Throughout this specification various terms commonly used in the alumina industry are used. In the interests of clarity, such terms are now defined.

The term "liquor" is used throughout this specification to refer to any solution containing aluminate ($Al(OH)_4^-$) ions and hydroxyl ($OH^-$) ions. In Bayer liquors, the principal constituents are sodium aluminate and sodium hydroxide.

'A' refers to the alumina concentration of the liquor and more specifically to the concentration of sodium aluminate in the liquor, expressed as equivalent g/L of alumina ($Al_2O_3$).

'C' refers to the caustic concentration of the liquor, this being the sum of the sodium aluminate and sodium hydroxide content of the liquor expressed as equivalent g/L concentration of sodium carbonate.

'A/C' is thus the ratio of alumina concentration to caustic concentration.

"Free caustic" is C-A (the caustic concentration minus the alumina concentration) with C and A each being expressed as equivalent g/L concentration of sodium carbonate.

The term "spent liquor" refers to any liquor stream after the gibbsite precipitation stage and prior to digestion. A spent liquor typically has a low A/C ratio. The term "green liquor" or "pregnant liquor" refers to liquor after digestion and prior to precipitation. A pregnant liquor typically has a high A/C ratio.

"Lake water" is the clarified liquor stream that is returned to the refinery from the mud disposal lake (if used) and typically has the lowest A of any liquor stream. The lake water typically has a high carbonate concentration due to reaction of the lake water with carbon dioxide from the atmosphere.

"S" refers to the soda concentration or more specifically to the sum of "C" and the actual sodium carbonate concentration, this sum once again being expressed as the equivalent g/L concentration of sodium carbonate. Thus, S-C (soda concentration minus caustic concentration) gives the actual concentration of sodium carbonate ($Na_2CO_3$) in the liquor, in g/L. A Bayer liquor's carbonate impurity level is expressed in terms of the caustic to soda ratio, or 'C/S'. A fully causticised (carbonate-free) Bayer process liquor will possess a C/S ratio of 1.00.

'Gibbsite' is aluminum trihydroxide ($Al(OH)_3$) which is also sometimes referred to in the literature as "hydrate" or "alumina trihydrate" and sometimes expressed using the chemically incorrect formula $Al_2O_3 3H_2O$.

'TCA' is tricalcium aluminate $Ca_3[Al(OH)_6]_2$, which is also commonly written using the formula $3CaO.Al_2O_3.6H_2O$ (TCA6) or C3AH6 in cement industry notation. Under appropriate conditions, caustic aluminate solutions will react with calcium from a suitable source such as slaked lime to form thermodynamically stable and sparingly soluble TCA. This reaction is utilised most commonly in the alumina industry to produce TCA crystals of a controlled particle size for use as a filter aid in the polishing or security filtration facility of the refinery, in which fine residual mud particles are "polished" from the green (or pregnant) liquor stream. The use of TCA for this purpose, and a process for the creation of an improved TCA filter aid are described in International Application No: PCT/AU01/00886 (WO 02/11856), the contents of which are incorporated herein by reference.

"TS" refers to the sum of all sodium salts in solution, expressed as the equivalent concentration in g/L of sodium carbonate.

The term "lime" as used throughout this specification is a generic term used to refer to calcium oxide (CaO or "quicklime") or calcium hydroxide ($Ca(OH)_2$) either in the form of a slaked lime slurry or the dry form of $Ca(OH)_2$ also referred to as "hydrated lime". Thus, a "slaked lime slurry" is produced when lime is mixed with a slaking solution which can be any aqueous solution, typically water.

"Causticisation" is the term usually used by persons skilled in the art of the Bayer process to describe the process whereby carbonate is removed from a Bayer liquor and replaced with hydroxide through the addition of slaked lime and precipitation of insoluble calcium carbonate. The term "causticisation" as used throughout this specification refers more broadly to any process in which an impurity anion is removed from a liquor and replaced with hydroxide ions.

"Layered Double Hydroxides" (LDHs) are a class of compounds which consist of sheets of the hydroxides of two or more metals of different valence. The metal hydroxide layers are positively charged, so charge neutrality requires that charge balancing or "guest" anions must be intercalated between the layers. Water is also usually present, hydrogen-bonded both to the hydroxyl ions of the metal hydroxide layers and to the intercalated guest anions. By virtue of their lamellar structure, the ability to adjust the separation of these layers, and the reactivity of the interlayer region, LDHs can be used for the controlled addition or removal of a variety of anionic species, both organic and inorganic.

The generic formula for these compounds can be expressed as:

$$[M_{3-x}^{z+}M_x^{3+}(OH)_6]^+[A_{b/n}^{n-}]mH_2O \qquad (3)$$

where M is a metal, A is an interlayer anion, $0 < x \leq 1$ and b=x or 2x-1 for z=2 or 1 respectively. In the context of the present invention, one of the metals in the above structure is aluminium and this species is referred to herein as an "aluminium-bearing LDH" with the generic formula of equation (4) below:

$$[M_{3-x}^{z+}Al_x^{3+}]^{b+}[X_{b/n}^{n-}]mH_2O \qquad (4)$$

in which M is a metal cation other than Al and with a valence other than 3 and, X is a monovalent charge-balancing or guest anion. It is to be clearly understood that X may equally be divalent or multi-valent provided only that charge neutrality is maintained.

The most common naturally occurring LDH is the Mg/Al species known as "hydrotalcite" ("HT"). Typically, HT compounds will be of the form $[Mg_3Al(OH)_6]_2.X.nH_2O$, where 'X' represents a charge-balancing anion or anions. The structures of many natural or synthesised LDHs are quite similar to HT, and it is common for an LDH comprising totally different combinations of metals to be referred to as a "hydrotalcite" even when Mg and Al are not present in the structure. The term "hydrocalumite" ("HC") is used throughout this specification to refer to aluminium-based LDH where M in equation (4) above is calcium. Typically, HC compounds will be of the form $[Ca_2Al(OH)_6]_2.X.nH_2O$, where 'X' represents a charge-balancing anion or anions. Hydrocalumite differs from hydrotalcite in that the Ca and Al form a well-ordered structure compared to the usually random distribution of Mg and Al in hydrotalcite.

The present invention relies on the formation of an aluminium-bearing LDH to recover dissolved alumina values from a first liquor in a convenient re-usable solid form. Using the aluminium-based LDH as a vehicle, the alumina values can be moved from a first location in an alumina refinery to a second location.

The present invention is further based on a realisation that for each mole of an aluminium-based LDH that forms in a liquor, a much larger number of moles of water are also removed from the liquor. The LDH thus acts like a sponge having an effect that is equivalent to evaporating and thus concentrating the liquor, a previously overlooked and potentially advantageous feature of these compounds. Beneficially, the formation of an aluminium-bearing layered double hydroxide can be used as a means for concentrating a first liquor stream by removing water from the first liquor like a sponge.

Alumina values are removed from a first liquor containing aluminate ions and hydroxyl ions in solution, by treating the first liquor with a hydroxide of a metal other than aluminium to form an aluminium-bearing layered double hydroxide and produce a treated stream of first liquor. As a direct result of the formation of the aluminium-bearing layered double hydroxide, the treated stream of first liquor has a final concentration of aluminate ions less than the initial concentration of aluminate ions.

The aluminium-bearing layered double hydroxide is then separated from the treated stream of first liquor. This clarified stream of treated first liquor (from which the solid aluminium-bearing LDH have been removed) is then directed to a first location within an alumina refinery, preferably prior to digestion and before precipitation.

The separated aluminium-bearing layered double hydroxide may be stored or sold or advantageously subjected to further processing in the alumina refinery to make use of the alumina values stored therein. The separated aluminium-bearing layered double hydroxide is brought into contact with a solution containing carbonate-ions to form a slurry comprising an insoluble salt of the metal other than aluminium and a second liquor comprising aluminate ions released from the aluminium-bearing layered double hydroxide. As a result of the aluminium-bearing LDH decomposing on contact with the solution containing carbonate ions, the aluminate ion concentration of the second liquor is increased.

The insoluble salt of the metal other than aluminium may then be separated from the second slurry to form a clarified stream of second liquor. The separated insoluble salt of the metal other than aluminium may be further treated, for example using calcination, to re-form the metal hydroxide used to form the aluminium-bearing LDH.

The advantages of the various aspects of the present invention are further described and illustrated by the following examples and experimental test results. These examples and experimental test results are illustrative of a variety of possible implementations and are not to be construed as limiting the invention in any way. It will be readily appreciated by persons skilled in the art that there is no one form of the Bayer Process, each alumina refinery having to modify the particular process conditions used depending on a number of factors, most notably the nature of the bauxite being processed. The present invention is thus not limited by the particular number or type of settling tanks, mud washers, causticisers, solid-liquid separators described in the following examples. Although other types of aluminium-based LDHs may equally be used to practice or test the various aspects of the present invention, the description to follow is limited for convenience and clarity to hydrocalumite (HC) as one preferred aluminium-bearing LDH. The present invention is equally applicable to other aluminium-bearing LDHs such as the Li/Al or Mg/Al species and is equally applicable to the recovery of alumina values from gibbsitic, boehmitic or diasporic bauxite.

EXAMPLE 1

Alumina Recovery from Feed to Digestion

A first embodiment of the present invention is illustrated in the simplified process flow diagram of FIG. 2. The bauxite ore is subjecting to grinding and desilication in the usual manner and then fed to a slurry tank 12 for slurrying prior to digestion. Using the traditionally Bayer process, a spent liquor stream from precipitation is also fed to the slurry tank 12. In this embodiment of the present invention, a first liquor in the form of all or part of the spent liquor stream after precipitation is diverted to a reaction vessel 14. Agitation conditions within the reaction vessel 14 are not critical, although the contents of the reaction vessel 14 should preferably be completely suspended.

A slaked lime slurry is formed in a slaker 16 by adding quicklime and a slurry solution to the slaker 16. The slaked lime slurry is then added to the reaction vessel 14 where it reacts with the aluminate ions in the first liquor to form an aluminium-bearing LDH, in this example, hydrocalumite, and a treated stream of first liquor having an alumina concentration that is less than the initial concentration of aluminate ions in the spent liquor fed to the reaction vessel 14. As the hydrocalumite forms in the reaction vessel 14, aluminate ions are removed from the first liquor and captured within the hydrocalumite structure.

Without wishing to be bound by theory, it is understood that hydrocalumite is formed in the reaction vessel 14 in accordance with equation (5) below:

$$4Ca(OH)_2 + 2Al(OH)_4^- + 2X^- + nH_2O \leftrightarrow [Ca_2Al(OH)_6]_2 X_2 \cdot nH_2O + 4OH^- \quad (5)$$

The charge balancing anion in equation (5) is represented in terms of a monovalent anion $X^-$ and thus equation (5) is balanced with respect to a monovalent anion being intercalated as the guest anion into the LDH structure of the hydrocalumite. One possible monovalent anion available in any Bayer liquor is the hydroxyl ion ($OH^-$). It is to be clearly understood that X can be any anionic species present in the first liquor, including divalent or higher valence anions, in which case equation (5) would need to be re-written to balance the charge. For example, if the charge balancing anion is the carbonate ion which is present in most Bayer liquors, a carbonate-bearing hydrocalumite forms in accordance with equation (6) below:

$$4Ca(OH)_2 + 2Al(OH)_4^- + CO_3^{2-} + nH_2O \leftrightarrow [Ca_2Al(OH)_6]_2 \cdot CO_3 \cdot nH_2O + 4H^- \quad (6)$$

The formation of hydrocalumite according to equation 6 is favoured by conditions of high lime concentration, high aluminate ion concentration, high carbonate ion concentration and low hydroxide concentration. Hydrocalumite formation will continue until either the calcium hydroxide or aluminate ions are almost completely consumed. To maintain charge neutrality, anions must be intercalated within the structure. Carbonate, the preferred anion, will continue to be absorbed into the structure until the material ceases forming, or almost all of the carbonate has been removed from solution. At low carbonate concentrations, other anions may thus be intercalated within the structure, leading to a process for the causticisation of other impurity salts in Bayer liquors. This latter aspect is the subject of International Application No. PCT/

AU00/00208 (WO 00/56660), the contents of which are incorporated herein by reference.

Conveniently, hydrocalumite is a solid species which can then be separated from the treated stream of first liquor by directing the product of the reaction vessel 14 to a solid/liquid separator 18 such as a pressure filter. The solid/liquid separation step can be conducted using any suitable solids/liquid separator 18 including gravity settling, cycloning, or centrifugation, but best performance is obtained by filtration. This filtration is simple to achieve, as the morphology of the hydrocalumite solids present in the first slurry facilitates easy separation.

The clarified treated stream of first liquor has a net increase in 'C' concentration and a reduction in the 'A' concentration. The treated stream of first liquor stream thus also has a reduced A/C ratio which makes it a more ideal liquor for mixing with the bauxite fed to the slurry tank 12 than a prior art spent liquor stream. This is because the combination of decreased 'A' and increased 'C' permits a greater amount of alumina to be dissolved from the bauxite per unit volume of liquor than for an equivalent liquor having a higher 'A' and lower 'C'.

Another beneficial outcome of the formation of hydrocalumite in the reaction vessel 14 is the removal of water from the first liquor in an amount dependent on the type of charge balancing anion intercalated into the LDH structure as it forms. When X is carbonate, at least five moles of water are incorporated into the hydrocalumite structure for every two moles of aluminate ion removed from the liquor with four moles of calcium hydroxide being consumed. The removal of water into the hydrocalumite structure partially dehydrates the spent liquor stream, giving the equivalent of additional evaporation. These savings are significant as the formation of hydrocalumite in a typical alumina refinery can result in dozens of tonnes per hour of water bypassing the digestion stage, where it would otherwise reduce the solubility of alumina and being transported instead to the green liquor where dilution assists precipitation. The removal of water prior to digestion has the flow-on effect of also reducing the volume of liquor entering the digesters. Digestion performance is therefore improved and the load to be heated on the way to the digesters is lowered. The amount of steam required for heating in the digesters is proportional to the amount of liquor circulated and the yield of alumina per unit of liquor circulated is proportional to the caustic soda concentration.

Dry hydrated lime could equally be added to the reaction vessel 14 in yet another embodiment of the present invention. It should further be noted that no essential difference in the chemistry of the process of the present invention has been found when quicklime (CaO) is added directly to the reaction vessel 14 instead of a slaked lime slurry, as the slaking reaction to form calcium hydroxide takes precedence over the reaction expressed in equations (5) or (6) above. However, the efficiency of reactions taking place in the reaction vessel 14 when quicklime is used can be poorer than when using a slaked lime slurry, evidently because the reaction products that form tend to inhibit the diffusion of calcium to the particle surface. This can result in some lime remaining unreacted.

Hydrocalumite, while quite stable at low temperature, becomes increasingly unstable as the temperature rises. For best results, the formation of hydrocalumite should be conducted under conditions of low to moderate temperature, typically between 20 and 120° C. The exact upper limit of temperature is a function of the alumina, carbonate and free hydroxide concentrations, but best performance with most liquors is obtained if the temperature is maintained between 70° C. and 80° C.

If too high a temperature is chosen, or too high free caustic concentration, there is a tendency for the reaction to be impeded by the formation of undesirable TCA, which acts as a diffusion barrier and robs alumina values from the liquor in a form that is not readily re-usable. TCA formation also tends to prevent full reaction of the calcium hydroxide, producing particles with a core of unreacted lime, reducing the efficiency of the reaction. The carbonate concentration is less important, but the lower the carbonate concentration, the lower the maximum temperature at which this step in the process can be operated. Suitable liquors will have an 'S' concentration of between 0 and 400 g/L (preferably between 40 and 200 g/L), and an A/C ratio of between 0 and 0.95 (preferably greater than 0.2). The residence time required for the completion of this reaction is not critical, typically between 5 and 90 minutes. However, if the correct liquor composition and temperature are used, longer residence times will have no discernible negative effects.

The residence time in the reaction vessel 14 is not critical. The reaction is generally found to be complete in less than five minutes, but residence times of up to 2 hours have little or no adverse effect. The preferred residence time is between 5 and 30 minutes. Excessive residence times may result in the undesirable formation of TCA, especially at high temperatures, causing a loss of efficiency. Similarly, to minimise the risk of formation of TCA the temperature in this reactor should not exceed 120° C. and should preferably be in the range of 20 to 100° C. and more preferably between 70 and 80° C.

The alumina values removed from the treated stream of first liquor when the hydrocalumite is formed can be returned at another suitable location within the refinery where it is advantageous to re-introduce aluminate ions, hydroxyl ions and water into the process. The solid hydrocalumite separated from treated stream of first liquor using the solid/liquid separator 18 is fed to a causticiser 22 in which it is brought into contact with a solution containing carbonate ions. In the causticiser 22, the hydrocalumite decomposes according to equation (7) to form a slurry comprising an insoluble compound calcium carbonate below and a second liquor comprising aluminate ions released form the hydrocalumite:

$$[Ca_2Al(OH)_6]_2X_2 \cdot nH_2O + 4CO_3^{2-} \leftrightarrow 4CaCO_3 + 2Al(OH)_4^- + 6OH^- + nH_2O + 2X^- \quad (7)$$

The cation associated with the solution containing carbonate ions could be any suitable species, with sodium being preferred as the sodium cation is already used elsewhere in the Bayer process and can thus be readily dealt with. One such source of carbonate ions is a compound referred to in the art as "Trona" which is a mixture of sodium carbonate and sodium bicarbonate. Another convenient solution containing carbonate ions is a second liquor stream such as any one of overflow streams from the mud washing circuit 24 as illustrated in FIG. 2. In this embodiment, the hydrocalumite separated from the treated stream of first liquor using the solid/liquid separator 18 is reslurried in causticiser 22 using a portion of a second liquor stream to be causticised as the source of carbonate ions. The temperature of the second liquor stream should be between 40 and 180° C., more preferably between 100° C. and 140° C. The liquor can be any process stream with an 'S' concentration between 40 and 350 g/L. However, best performance will be obtained with more dilute liquors with an 'S' concentration of between 100 and 160 g/L. In one embodiment, the second liquor is heated to close to the atmospheric boiling point before being directed to the causticiser 22 in which it is held for between 20 minutes and 4 hours, preferably 2 hours at 103° C., during which time the reaction described by equation (7) occurs.

The agitation conditions within the causticiser 22 should be controlled such that all of the solids are suspended, but excessive agitation should be avoided to minimise the formation of undesirable TCA rather than the more desirable calcium carbonate species. Preferably, a plug flow reactor is used for the causticiser 22 although a stirred reactor vessel is quite adequate.

In another embodiment, the re-slurried hydrocalumite is heated to higher temperatures, typically between approximately 100° C. and 180° C., more preferably to between 120° C. and 140° C. and require a residence time of between 1 to 40 minutes.

The carbonate ion concentration of the second liquor stream may be supplemented by the addition of a stream or solid species that is rich in sodium carbonate. This can be supplied in various ways, such as via a salting out evaporator, as Trona (to supplement existing caustic input to the plant), or by linking the discharge from an oxidative organics removal process, such as wet oxidation or electrolysis. Alternatively, the sodium carbonate concentration could be increased at the expense of the caustic concentration by reacting the liquor with carbon dioxide using a sparge or other suitable gas absorption system. If desired, the hydrocalumite can equally be reslurried in the causticiser 22 using water if sodium carbonate is added to serve as the source of carbonate ions.

It is worth noting that in a Bayer liquor and in the presence of carbonate, the hydrocalumite decomposes according to two possible reactions—a desirable reaction with carbonate ions in which calcium carbonate is formed, and an undesirable reaction in which TCA forms. The rate of decomposition and the species that forms depends upon the composition of the solution with which the HC species are in contact and the temperature of the solution. TCA formation is undesirable because this results in the removal of alumina values from the process in the form of an insoluble solid. Calcium carbonate formation on the other hand does not result in any alumina values being lost and has the further benefit of the potential to regenerate lime via calcination.

As taught in International Application No. PCT/AU99/00757 (WO 00/18684), the contents of which are incorporated herein by reference, suitable inhibitors can be added as an optional feature to reduce the undesirable reaction of the hydrocalumite to form TCA. Suitable inhibitors do not appreciably affect the reaction of hydrocalumite with carbonate to form calcium carbonate. Without wishing to be bound by theory, this is understood to be because the reaction of hydrocalumite with aluminate and hydroxyl ions to form TCA is diffusion controlled, while the reaction of HC with carbonate (equation (7)) is under chemical control. Consequently, compounds that adsorb at active sites at the HC surface will inhibit the diffusion of active species at these sites, retarding the reaction. On the other hand, while the presence of these adsorbed molecules may also partially inhibit the reaction with carbonate, the effect will be far less. This slight decrease in the rate of reaction of HC with carbonate can be suitably overcome by enhancing any of the factors known to favour equation (7) of which increasing the temperature is probably the most effective and simple to achieve.

Virtually any class of surfactant can be used as the inhibitor in this context, providing it stabilises the hydrocalumite structure. For example, sugars such as sucrose and glucose, and polysaccharides such as starch can be used. However, anionic organic surfactants are most effective. A non-exclusive list of examples of this class of compound includes the following materials, their salts and derivatives: any anionic homopolymers or copolymers (e.g. polyacrylic acid and its co-polymers with acrylamide, or polymers bearing hydroxamate functional groups), hydroxamic acids, humic and tannic acids, lignosulphonates, fatty acids, sulphonated carboxylic acids, carboxylic acids, and polyhydroxy carboxylic acids. The addition of the inhibitor can be made at any point prior to the location to which the aluminium-bearing LDH is being made. The inhibitor may be added with the liquor fed to reaction vessel 14, added with the lime fed to the reaction vessel 14, or added to the slaker 16. It is also possible to dose the inhibitor into the reaction vessel 14 as the hydrocalumite forms or add the inhibitor to other locations within the Bayer refinery, provided that a significant proportion of the material reports to the reaction vessel 14. The dose rate for a particular inhibitor is a factor that a person skilled in the art is considered capable of determining by way of experiment. Dosing with a TCA inhibitor is completely optional but provides enhanced performance.

After decomposition of the hydrocalumite to form insoluble calcium carbonate in the causticiser 22, the resultant slurry is pumped to a solid/liquid separation device 30 such as a pressure decanter, gravity settler, cyclone, centrifuge or preferably filter. The calcium carbonate solids separated from the slurry using the solid/liquid separation device 30 may be discarded or washed and calcined to re-generate quicklime. The re-generated quicklime may be used as a feed to the slaker 16.

The clarified second liquor from solid/liquid separator 30 is enhanced with aluminate ions, water and hydroxide ions and is directed to the settlers 32 or the liquor polishing filters 34. Alumina values are in this way delivered to the pregnant liquor where they can be recovered during precipitation. The water being added also aids in precipitation by increasing supersaturation.

The maximum C/S that can be achieved is much more strongly affected by the hydroxide concentration than the aluminate concentration, so it is of some benefit if the liquor fed to this process has a high A/C ratio (i.e., low free caustic). However, the rate of equation (7) is impaired if the aluminate concentration is too high. A preferred A/C range is between 0.5 and 0.7.

From the description above, it is apparent that the process of the present invention as used in this embodiment allows for alumina values to be removed from the liquor fed to digestion and be delivered instead to the pregnant liquor to assist in precipitation. The hydrocalumite is being used as a convenient vehicle for transporting the aluminate ions from a first location to a second location in the refinery. Moreover the hydrocalumite is being used as a means of removing several moles of water per mole of hydrocalumite in the form of an easily separated solid species from a liquor at one location and recovering it to a liquor at another. This process of alumina "shuttling" can be operated even in refineries with relatively low carbonate loading by introducing sodium carbonate ore (e.g., Trona or Natrite) into the causticiser feed stream, forming an alternative or supplementary supply of caustic to the refinery. Alternatively, carbon dioxide may be used to reduce the causticity (C/S) of the target stream by reacting the liquor with the gas using any suitable gas entrainment reactor or sparging system. Before re-slurrying—Pre-treatment of source of carbonate ions.

Experimental Results

Test 1: Removal of Alumina from Spent Liquor

A sample of Spent Liquor from an alumina refinery was collected, filtered and aliquots of 921.4 g (680 mL) were weighed into each of four 1000 mL polypropylene bottles. The bottles were sealed, placed in a thermostatically controlled rolling-bottle water bath, and rolled end-over-end until the contents of the bottles had equilibrated at the water bath temperature of 70° C. Aliquots of slaked lime slurry were prepared by weighing 62.2 g of hydrated lime (85% available $Ca(OH)_2$) into 250 mL polypropylene bottles, adding 210 g of hot deionised water, sealing the bottles and shaking to form a slurry.

The samples of spent liquor were removed one at a time from the water bath, opened and the slaked lime slurry added. The liquor bottle was then sealed and returned to the water bath and tumbled end-over-end at 70° C. for 90 minutes. The bottles were then removed, the liquor sampled for analysis and the solids collected by vacuum filtration. The collected solids were then washed on the filter with room-temperature deionised water, and dewatered to obtain a compact cake that appeared visibly dry. The cake was stored in sealed plastic bags for use in the subsequent alumina recovery step.

A sample of the cake was removed for analysis. XRD was performed on the sample to determine the phases present. Another portion of the visibly dry cake was subjected to drying under vacuum at 110° C. to determine the residual moisture level. The dried cake was further analysed for elemental composition using XRF.

The treated and untreated Spent Liquor samples were analysed for their alumina (A), caustic (C), soda (S) total soda (TS) content, and the density at 25° C. was also determined.

The results of Test 1 are summarised in Table 1 below with a correction having been made in the mass balance to account for the samples removed for analysis.

TABLE 1

Liquor Analyses

|  | Untreated Spent Liquor | Treated Spent Liquor |
|---|---|---|
| Mass (g) | 924.08 | 1092.7 |
| A (g/L) | 120.5 | 80.1 |
| C (g/L) | 265.9 | 226.8 |
| S (g/L) | 311.5 | 248.5 |
| A/C | 0.453 | 0.353 |
| C/S | 0.854 | 0.913 |
| Density (g/cc, 25° C.) | 1.3589 | 1.2819 |
| Volume (mL) | 680 | 852.4 |
| Alumina removed (as $Al_2O_3$) | | 13.7 g |
| Conversion of available $Ca(OH)_2$ to hydrocalumite | | 83.6% |
| Liquor volume reduction due to alumina loss | | 15.1 mL |
| Water incorporated into hydrocalumite galleries | | 4.3 mL |
| Moles of water incorporated per mole of hydrocalumite | | 10.5 mL |

With reference to the results presented in Table 1, approximately 17% of the alumina content of the Spent Liquor was removed from solution and captured in the hydrocalumite solids. The actual amount removed is limited by the availability of the reactants (in this case lime). Approximately 83.6% of the available $Ca(OH)_2$ content of the slaked lime solids was converted to hydrocalumite. The XRD analysis indicated that the remainder of the solids in the cake was mostly unreacted portlandite, and a trace of TCA (tricalcium aluminate). Negligible calcite was present.

Water was used in this experiment to disperse the hydrated lime in the slaked lime slurry to ensure accuracy in the quantitative analysis. In practice the addition of water is not essential, and hence the dilution of the liquor caused by this experimental procedure can be avoided when the process is used in an alumina refinery.

This example demonstrates that both alumina and water have been removed from the solution and have been captured in the hydrocalumite solids, while the causticity of the treated liquor has simultaneously been increased.

Test 2: Recovery of Alumina into $1^{st}$ Mud Washer Overflow Liquor

A sample of First Washer Overflow Liquor of an alumina refinery was collected, filtered, and 1578.7 g (1300 mL) was weighed into a 2 litre agitated Monel autoclave vessel. The liquor was heated to 103° C. and agitated at 300 rpm. 1.8 mL of a concentrated sodium gluconate solution was added to the overflow liquor to give a concentration of 60 mg/L.

A 66.4 g sample of the damp hydrocalumite cake prepared according to Test 1 described above, was weighed into a 250 mL polypropylene bottle, and then slurried and washed into the autoclave with a total of 119.6 g of room temperature deionised water. The reactor was sealed and the reaction allowed to proceed at 103° C. with agitation at 300 rpm for 120 minutes. After removal of a liquor sample for analysis, the entire contents of the reactor were collected, and the solids collected by vacuum filtration. The filter cake was washed with room temperature water on the filter, dewatered until visually dry and stored in plastic bags for later analysis.

A sample of the cake was removed for analysis. XRD was performed on the sample to determine the phases present. Another portion of the visibly dry cake was subjected to drying under vacuum at 110° C. to determine the residual moisture level. The dried cake was further analysed for elemental composition using XRF.

The treated and untreated First Washer Overflow Liquor samples were analysed for their alumina (A), caustic (C), soda (S) total soda (TS) content, and the density at 25° C. was also determined. The results of Test 2 are summarised in Table 2 below with a correction having been made in the mass balance to account for the samples removed for analysis.

TABLE 2

Liquor Analyses

|  | Untreated $1^{st}$ washer overflow liquor | Treated $1^{st}$ washer overflow liquor |
|---|---|---|
| Mass (g) | 1578.7 | 1711.7 |
| A (g/L) | 89.8 | 83.3 |
| C (g/L) | 132.3 | 128.8 |
| S (g/L) | 158.0 | 143.4 |
| A/C | 0.679 | 0.647 |
| C/S | 0.837 | 0.898 |
| Density (g/cc, 25° C.) | 1.2144 | 1.1950 |
| Volume (mL) | 1300 | 1432.4 |
| Alumina recovered (as $Al_2O_3$) | | 2.62 g |
| Recovery of alumina from hydrocalumite | | 74.0% |
| Liquor volume increase due to alumina gain | | 2.0 mL |
| Water released from hydrocalumite galleries | | 10.6 mL |
| Entrained liquid in hydrocalumite cake | | 7.3 mL |

With reference to Table 2, hydrocalumite cake formed according to Test 1 described above has been reacted with carbonate ions in the First Washer Overflow Liquor to form calcium carbonate, and release water and alumina into solution. Test 2 demonstrates that the reaction is capable of releasing aluminate ions into a solution that is already highly supersaturated with respect to gibbsite, and that alumina may thus be "shuttled" or transferred from a liquor prior to digestion, and recovered in another liquor post-digestion. The amount of alumina that can be transferred in this way is controlled by the amount of carbonate present in the second liquor (in this example, the $1^{st}$ Washer Overflow Liquor) and the maximum causticity (C/S) that can be achieved in this liquor.

XRD analysis of the solids indicated the product was almost exclusively calcite, with traces of residual hydrocalumite and TCA and no portlandite. The absence of portlandite indicates that any lime that fails to react in the first step of hydrocalumite formation is usefully consumed in this step.

Water was used in this experiment to disperse the hydrated lime to ensure accuracy in the quantitative analysis. In practice this water is not essential, and hence the dilution of the liquor caused by this can be avoided.

EXAMPLE 2

Mud Washing Circuit

A second embodiment of the present invention is now described with reference to FIG. 3 in which like apparatus is referred to using like reference numerals. In the counter-current mud washing circuit 24, the alumina concentration of the washer overflow from the first mud washer 40 is quite high, typically as much as about half that of the pregnant liquor that overflows the settling tank 32 in the clarification stage. Using counter-current decantation, the mud residue is pumped from the first washer 40 to the second washer 42 and so on to the $n^{th}$ washer 44 while fresh water or lake water is introduced firstly to the last $(n-{}^{th})$ washer 44 in the mud washing circuit 24 and overflows to the $n-1^{th}$ washer 46 and so on up to the first mud washer 40. In the traditional Bayer process alumina values are lost in the mud washing circuit due to precipitation, as well as in soluble form in the liquor accompanying the mud to the mud residue disposal areas. The washer overflow liquor in all stages of the mud washing circuit is, like most liquors, supersaturated with respect to gibbsite. The wash overflow liquor becomes progressively cooler and more dilute with each successive stage of washing resulting in alumina losses due to precipitation onto the mud particles.

In this second embodiment, hydrocalumite is formed in reaction vessel 14 using the same process as described above in Example 1, the only difference being that the first liquor fed to the reaction vessel in this embodiment is the washer overflow from the $n-1^{th}$ washer 46. It is to be understood that the washer overflow liquor from any of the other mud washers could equally be used, however recovery of alumina values via hydrocalumite is most efficient when the washer overflow liquor is taken from any one or each of the $2^{nd}$ to $n-1^{th}$ washer and least favourable when the first liquor is the overflow from the first or last washers in the mud washing circuit. It is pointless to use the overflow from the first washer 40, as the overflow liquor from the first washer 40 is fed to the settling tank 32 in any event. The alumina concentration of the overflow liquor to the final $(n^{th})$ washer is generally similar to lake water and is therefore too low to be of practical benefit. In addition, removal of alumina at this stage does little to prevent precipitation of gibbsite further up the mud washing circuit.

The hydrocalumite formed in the reaction vessel 14 is removed in the manner described above for Example 1 using solid/liquid separator 18 with the clarified treated stream of first liquor (from which alumina values have been removed) being returned to the next washer in series, in this example to the $n-2^{th}$ washer 48 at the point where it would normally have returned. Due to the formation and removal of the HC, alumina values are recovered from the mud washing circuit 24 that may otherwise have been lost due to precipitation or discarded in soluble form with the liquor accompanying the mud. The removal of water also assists in reducing supersaturation.

The separated hydrocalumite solids from the solid/liquid separator 18 are directed to the causticiser 22 in which alumina values are recovered from the hydrocalumite by contacting the hydrocalumite with a solution containing carbonate ions to decompose the hydrocalumite and form calcium carbonate in the manner described above for Example 1. In this embodiment, the slurry from the causticiser 32 is directed to solid/liquid separator 30. The solids removed from the slurry using the solid/liquid separator 30 are returned to the mud washing circuit 24 and the clarified treated second liquor from the solid/liquid separator 30 is returned to the settler 32 or the polishing filters 34.

It is to be clearly understood that while only one of the washer overflow streams is being treated to recover alumina in FIG. 3, the present invention is equally applicable to the treatment of a plurality of washer overflow streams each being treated in one or a corresponding plurality of reaction vessels 14. It is also to be clearly understood that the processes described in Examples 1 and 2 above may equally be used independently or in combination with each other.

Experimental Results

Test 3: Removal of Alumina from $2^{nd}$ Mud Washer Overflow Liquor

A sample of overflow liquor from the 2 mud washer of an alumina refinery was collected, filtered and aliquots of 786.3 g (680 mL) were weighed into each of four 1000 mL polypropylene bottles. The bottles were sealed, placed in a thermostatically controlled rolling-bottle water bath, and rolled end-over-end until the contents of the bottles had equilibrated at the water bath temperature of 80° C. Aliquots of slaked lime slurry were prepared by weighing 62.2 g of hydrated lime (85% available $Ca(OH)_2$) into 250 mL polypropylene bottles, adding 212.5 g of hot deionised water, sealing the bottles and shaking to form the slaked lime slurry.

The samples of washer overflow liquor were removed one at a time from the waterbath, opened and the slaked lime slurry added. The liquor bottle was then sealed and returned to the water bath and tumbled end-over-end at 80° C. for 60 minutes. The bottles were then removed, the liquor sampled for analysis and the solids collected by vacuum filtration. The collected solids were then washed on the filter with room-temperature deionised water, and dewatered to obtain a compact cake that appeared visibly dry. The cake was stored in sealed plastic bags for use in the subsequent alumina recovery step.

A sample of the cake was removed for analysis. XRD was performed on the sample to determine the phases present. Another portion of the visibly dry cake was subjected to drying under vacuum at 110° C. to determine the residual moisture level. The dried cake was further analysed for elemental composition using XRF.

The treated and untreated samples of the $2^{nd}$ Washer Overflow Liquor were analysed for their alumina (A), caustic (C), soda (S) total soda (TS) content, and the density at 25° C. was also determined. The results of Test 3 are summarised in Table 3 below with a correction having been made in the mass balance to account for the samples removed for analysis.

TABLE 3

Liquor Analyses

| | Untreated 2$^{nd}$ washer overflow liquor | Treated 2$^{nd}$ washer overflow liquor |
|---|---|---|
| Mass (g) | 786.25 | 930.6 |
| A (g/L) | 61.8 | 33.5 |
| C (g/L) | 94.5 | 90.4 |
| S (g/L) | 115.1 | 93.7 |
| A/C | 0.654 | 0.370 |
| C/S | 0.821 | 0.965 |
| Density (g/cc, 25° C.) | 1.1563 | 1.1141 |
| Volume (mL) | 680.0 | 835.4 |
| Alumina removed (as Al$_2$O$_3$) | | 14.04 g |
| Conversion of available Ca(OH)$_2$ to hydrocalumite | | 83.5% |
| Liquor volume reduction due to alumina loss | | 8.9 mL |
| Water incorporated into hydrocalumite galleries | | 48.2 mL |
| Moles of water incorporated per mole of hydrocalumite | | 16.0 |

With reference to Table 3, approximately 33% of the alumina content of the liquor was removed from solution and captured in the hydrocalumite solids. The actual amount removed is limited by the availability of the reactants (in this case lime). Approximately 83.5% of the available Ca(OH)$_2$ content of the slaked lime solids was converted to hydrocalumite—XRD analysis indicated that the remainder of the solids was unreacted portlandite. Negligible calcite or TCA (tricalcium aluminate) were present.

Water was used in this experiment to disperse the hydrated lime to ensure accuracy in the quantitative analysis. In practice this water is not essential, and hence the dilution of the liquor caused by this can be avoided.

As can be seen from the above example, both alumina and water have been removed from the solution and have been captured in the hydrocalumite solids.

Test 4: Recovery of Alumina into 1$^{st}$ Mud Washer Overflow Liquor

A sample of overflow liquor from the 1$^{st}$ mud washer of an alumina refinery was collected, filtered and 1600 g was weighed into a 2 litre agitated Monel autoclave vessel. The liquor was heated to 103° C. and agitated at 300 rpm. 1.8 mL of a concentrated sodium gluconate solution was added to the liquor to give a concentration of 60 mg/L.

A sample of the damp hydrocalumite cake prepared in the previous step (66.5 g) was weighed into a 250 mL polypropylene bottle, and then slurried and washed into the autoclave with a total of 115 g of room temperature deionised water. The reactor was sealed and the reaction allowed to proceed at 103° C. with agitation at 300 rpm for 120 minutes. After removal of a liquor sample for analysis, the entire contents of the reactor were collected, and the solids collected by vacuum filtration. The filter cake was washed with room temperature water on the filter, dewatered until visually dry and stored in plastic bags for later analysis.

A sample of the cake was removed for analysis. XRD was performed on the sample to determine the phases present. Another portion of the visibly dry cake was subjected to drying under vacuum at 110° C. to determine the residual moisture level. The dried cake was further analysed for elemental composition using XRF.

The treated and untreated 1$^{st}$ mud washer overflow liquor samples were analysed for their alumina (A), caustic (C), soda (S) total soda (TS) content, and the density at 25° C. was also determined.

The results of Test 4 are presented below in Table 4 with correction made in the mass balance to account for the samples that were removed for analysis.

TABLE 4

Liquor Analyses

| | Untreated 1$^{st}$ washer overflow liquor | Treated 1$^{st}$ washer overflow liquor |
|---|---|---|
| Mass (g) | 1600.4 | 1737.7 |
| A (g/L) | 94.1 | 87.5 |
| C (g/L) | 138.1 | 134.9 |
| S (g/L) | 165.7 | 150.2 |
| A/C | 0.682 | 0.649 |
| C/S | 0.833 | 0.898 |
| Density (g/cc, 25° C.) | 1.2223 | 1.2030 |
| Volume (mL) | 1309.3 | 1444.5 |
| Alumina recovered (as Al$_2$O$_3$) | | 3.11 g |
| Recovery of alumina from hydrocalumite | | 83.0% |
| Liquor volume increase due to alumina gain | | 2.4 mL |
| Water released from hydrocalumite galleries | | 10.6 mL |
| Entrained liquid in hydrocalumite cake | | 7.3 mL |

In this example, hydrocalumite cake formed in 2$^{nd}$ washer overflow from the previous step has been reacted with carbonate ions in 1$^{st}$ washer overflow to form calcium carbonate, and release water and alumina into solution. This experiment demonstrates that the reaction is capable of releasing aluminate ions into a solution that is already supersaturated with respect to gibbsite. The amount of alumina that can be transferred in this way is controlled by the amount of carbonate present in the target liquor (the 1$^{st}$ washer overflow) and the maximum causticity (C/S) that can be achieved in this liquor.

Test 5: Increasing the Alumina Recovery Capacity of a 1$^{st}$ Mud Washer Overflow Liquor Through the Addition of Sodium Carbonate A sample of overflow liquor from the 1$^{st}$ mud washer from an alumina refinery was collected, filtered and 1629 g was weighed into a 2 litre agitated Monel autoclave vessel. Anhydrous sodium carbonate (42.3 g) was added to the liquor and allowed to dissolve whilst agitating the mixture at 300 rpm and 80° C. A sample of the solution was taken for analysis and the remainder heated to 103° C. 1.8 mL of a concentrated sodium gluconate solution was added to the liquor to give a concentration of 60 mg/L.

A 242.2 g sample of the damp hydrocalumite cake prepared according to Test 3 described above was weighed into a 500 mL polypropylene bottle, and then slurried and washed into the autoclave with a total of 245 g of room temperature deionised water. The reactor was sealed and the reaction allowed to proceed at 103° C. with agitation at 300 rpm for 120 minutes. After removal of a liquor sample for analysis, the entire contents of the reactor were collected, and the solids collected by vacuum filtration. The filter cake was washed with room temperature water on the filter, dewatered until visually dry and stored in plastic bags for later analysis.

A sample of the cake was removed for analysis. XRD was performed on the sample to determine the phases present. Another portion of the visibly dry cake was subjected to drying under vacuum at 110° C. to determine the residual moisture level. The dried cake was further analysed for elemental composition using XRF.

The treated and untreated 1$^{st}$ Washer Overflow Liquor samples of Test 5 were analysed for their alumina (A), caustic (C), soda (S) total soda (TS) content, and the density at 25° C. was also determined. The results of Test 5 are summarised in Table 5 below with a correction having been made in the mass balance to account for the samples removed for analysis.

TABLE 5

Liquor Analyses

| | 1st washer overflow liquor with added $Na_2CO_3$ | Treated 1st washer overflow liquor |
|---|---|---|
| Mass (g) | 1628.9 | 2011.28 |
| A (g/L) | 97.2 | 82.4 |
| C (g/L) | 143.1 | 141.9 |
| S (g/L) | 201.1 | 156.1 |
| A/C | 0.679 | 0.581 |
| C/S | 0.712 | 0.909 |
| Density (g/cc, 25° C.) | 1.2544 | 1.2022 |
| Volume (mL) | 1298.5 | 1673 |
| Alumina recovered (as $Al_2O_3$) | | 11.6 g |
| Recovery of alumina from hydrocalumite | | 86.0% |
| Liquor volume increase due to alumina gain | | 5.6 mL |
| Water released from hydrocalumite galleries | | 38.3 mL |
| Entrained liquid in hydrocalumite cake | | 84.2 mL |

With reference to Table 5, hydrocalumite cake formed in 2nd washer overflow from Test 3 has been reacted with carbonate ions in 1st washer overflow to form calcium carbonate, and release water and alumina into solution. By fortifying the 1st washer overflow liquor with sodium carbonate, the amount of alumina that could be recovered to the liquor was substantially increased relative to the previous example (11.6 g versus 3.1 g). Similarly, the capacity to recover alumina to a liquor such as 1st washer overflow could be increased by treating the liquor with carbon dioxide to reduce the initial causticity.

Now that several embodiments of the invention have been described in detail, it will be apparent to persons skilled in the chemical engineering arts that numerous variations and modifications can be made without departing from the basic inventive concepts. For example, while the charge balancing anions described above are generally carbonate or hydroxyl ions, they could equally be sulphate, oxalate or any other anionic species that becomes intercalated in the aluminium-based LDH structure due to the particular conditions of the first liquor. If, for example the charge balancing anion is sulphate this will decompose to produce insoluble calcium carbonate, sodium aluminate, caustic (NaOH), and sodium sulphate in solution. The present invention is equally applicable to the recovery of alumina values from any liquor stream that would otherwise result in unrecoverable alumina losses or reduce the efficiency of alumina dissolution. All such modifications and variations are considered to be within the scope of the present invention, the nature of which is to be determined from the foregoing description and the appended claims.

It will be clearly understood that, although a number of prior art publications are referred to herein, this reference does not constitute an admission that any of these documents forms part of the common general knowledge in the art, in Australia or in any other country. In the statement of invention and description of the invention which follow, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

I claim:

1. A process for recovering alumina values from a first liquor having an initial concentration of aluminate ions and hydroxyl ions in solution, the process comprising:
    (a) treating the first liquor with a hydroxide of a metal other than aluminum to form an aluminum-bearing layered double hydroxide and produce a treated stream of first liquor, the treated stream of first liquor comprising a spent liquor having a final concentration of aluminate ions less than the initial concentration of aluminate ions;
    (b) separating the aluminum-bearing layered double hydroxide of step (a) from the treated stream of first liquor to recover aluminum from the layered double hydroxide; and
    (c) subsequent to step (b), returning the treated stream of first liquor to digestion.

2. The process of claim 1 further comprising the step of contacting the separated aluminum-bearing layered double hydroxide of step (b) with a solution containing carbonate ions to form a slurry comprising an insoluble salt of the metal other than aluminum and a second liquor comprising aluminate ions released from the aluminum-bearing layered double hydroxide.

3. The process of claim 2, further comprising the step of separating the insoluble salt of the metal other than aluminum from the slurry to form a clarified stream of second liquor.

4. The process of claim 3 further comprising the step of treating the separated insoluble salt of the metal other than aluminum to regenerate hydroxide of the metal other than aluminum used in step (a).

5. The process of claim 3 further comprising the step of returning the clarified stream of second liquor to a second location in the alumina refinery.

6. The process of claim 5, wherein the second location in the alumina refinery is clarification after digestion and prior to precipitation.

7. The process of claim 2, wherein the solution containing carbonate ions is lake water, a spent liquor or an overflow stream from a mud washing stage.

8. The process of claim 7, wherein the solution containing carbonate ions contains one or both of sodium carbonate or sodium bicarbonate.

9. The process of claims 2 further comprising the step of boosting the carbonate concentration of the solution containing carbonate ions by adding a liquor stream or solid species rich in sodium carbonate.

10. The process of claim 2 further comprising the step of boosting the carbonate concentration of the solution containing carbonate ions by adding carbon dioxide.

11. The process of claim 10, wherein the step of adding carbon dioxide is conducted using a sparge or a gas absorption system.

12. The process of claim 1, wherein the metal other than aluminum is calcium and the aluminum-bearing layered double hydroxide is hydrocalumite.

13. The process of claim 12, wherein the calcium hydroxide used for step a) is formed by slaking of quicklime in a slaking solution.

14. The process of claim 12, wherein the calcium hydroxide used for step (a) is added in dry form or as hydrated lime or formed in situ following the addition of quicklime to the first liquor.

15. The process of claim 1 further comprising the step of adding a surfactant prior to or during step (a) so as to inhibit an undesirable reaction of a hydrocalumite species to form tricalcium aluminate.

16. The process of claim 1, wherein the metal other than aluminum is magnesium and the aluminum-bearing layered double hydroxide is hydrotalcite.

17. A method of transporting alumina values, the method comprising:
(a) forming an aluminum-bearing layered double hydroxide via the process of claim 1; and
(b) transporting the alumina values from a first location in an alumina refinery to a second location in the alumina refinery, wherein the aluminum-bearing layered double hydroxide serves as a vehicle for transporting the alumina values, and the first location is digestion and the second location is clarification after digestion and prior to precipitation.

18. The process of claim 17, further comprising the step of contacting the separated aluminum-bearing layered double hydroxide of step (b) of claim 1 with a solution containing carbonate ions to form a slurry comprising an insoluble salt of the metal other than aluminum and a second liquor comprising aluminate ions released from the aluminum-bearing layered double hydroxide.

19. The process of claim 18, further comprising the step of separating the insoluble salt of the metal other than aluminum from the slurry to form a clarified stream of second liquor.

20. The process of claim 19, further comprising the step of treating the separated insoluble salt of the metal other than aluminum to regenerate the metal hydroxide used in step (a) of claim 1.

21. The process of claim 19, further comprising the step of returning the clarified stream of second liquor to a second location in the alumina refinery.

22. The process of claim 21, wherein the second location in the alumina refinery is clarification after digestion and prior to precipitation.

23. The process of claim 18, wherein the solution containing carbonate ions is lake water, a spent liquor or an overflow stream from a mud washing stage.

24. The process of claim 18, wherein the solution containing carbonate ions contains one or both of sodium carbonate or sodium bicarbonate.

25. The process of claims 18, further comprising the step of boosting the carbonate concentration of the solution containing carbonate ions by adding a liquor stream or solid species rich in sodium carbonate.

26. The process of claim 18, further comprising the step of boosting the carbonate concentration of the solution containing carbonate ions by adding carbon dioxide.

27. The process of claim 26, wherein the step of adding carbon dioxide is conducted using a sparge or a gas absorption system.

28. The process of claim 17, wherein the metal other than aluminum is calcium and the aluminum-bearing layered double hydroxide is hydrocalumite.

29. The process of claim 28, wherein the calcium hydroxide used for step (a) is formed by slaking of quicklime in a slaking solution.

30. The process of claim 28, wherein the calcium hydroxide used for step (a) is added in dry form or as hydrated lime or formed in situ following the addition of quicklime to the first liquor.

31. The process of claim 17, further comprising the step of adding a surfactant prior to or during step (a) so as to inhibit an undesirable reaction of the hydrocalumite species to form tricalcium aluminate.

32. The process of claim 17, wherein the metal other than aluminum is magnesium and the aluminum-bearing layered double hydroxide is hydrotalcite.

33. A process for recovering alumina values from a first liquor having an initial concentration of aluminate ions and hydroxyl ions in solution, the process comprising:
(a) treating the first liquor with a hydroxide of a metal other than aluminum to form an aluminum-bearing layered double hydroxide and produce a treated stream of first liquor, the treated stream of first liquor being a washer overflow liquor having a final concentration of aluminate ions less than the initial concentration of aluminate ions;
(b) separating the aluminum-bearing layered double hydroxide of step (a) from the treated stream of first liquor to recover aluminum from the layered double hydroxide; and
(c) subsequent to step (b), returning the treated stream of first liquor to a preceding mud washer stage in a countercurrent mud washing circuit.

34. A method of transporting alumina values, the method comprising:
(a) forming a vehicle comprising an aluminum-bearing layered double hydroxide via the process of claim 33; and
(b) transporting the alumina values from a first location in an alumina refinery to a second location in the alumina refinery, wherein the aluminum-bearing layered double hydroxide serves as a vehicle for transporting the alumina values.

* * * * *